United States Patent [19]

Dooley

[11] Patent Number: 4,691,465

[45] Date of Patent: Sep. 8, 1987

[54] GAFF FOR LANDING FISH

[76] Inventor: Patrick D. Dooley, 1519 Simeonoff, Kodiak, Ak. 99615

[21] Appl. No.: 871,475

[22] Filed: Jun. 6, 1986

[51] Int. Cl.[4] ............................................. A01K 97/14
[52] U.S. Cl. ......................................................... 43/5
[58] Field of Search ........................... 43/5, 6; 294/26; 16/111 R, DIG. 12

[56] References Cited

U.S. PATENT DOCUMENTS

| 1,503,251 | 7/1924 | Schoof | 16/DIG. 12 |
| 2,882,084 | 4/1959 | Eatinger | 43/5 |
| 3,083,490 | 4/1963 | Klozik | 43/6 |
| 3,614,947 | 10/1971 | Feldman | 43/6 |

FOREIGN PATENT DOCUMENTS 215650  6/1968  U.S.S.R. ............................ 43/6

Primary Examiner—Gene P. Crosby
Attorney, Agent, or Firm—Christopher Duffy

[57] ABSTRACT

The gaff has a pistol grip handle with finger indentations therein, and an enlarged butt and head, enabling the user to maintain his arm in line with the shank of the gaff and thus experience less fatigue while having a better grip on the gaff and better control of it in landing the fish.

6 Claims, 7 Drawing Figures

U.S. Patent  Sep. 8, 1987  4,691,465
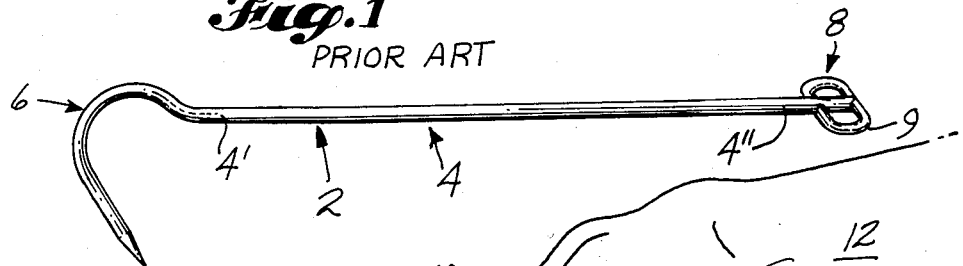
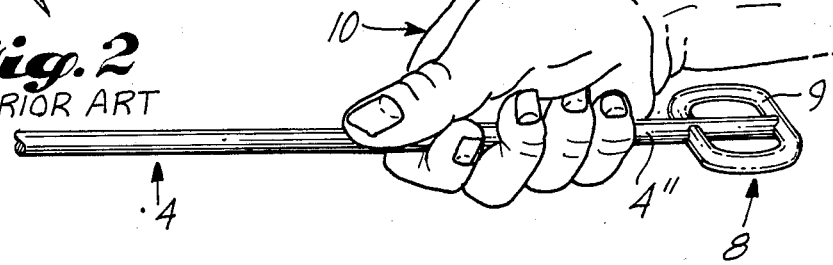
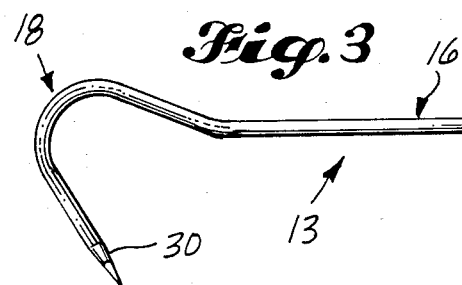
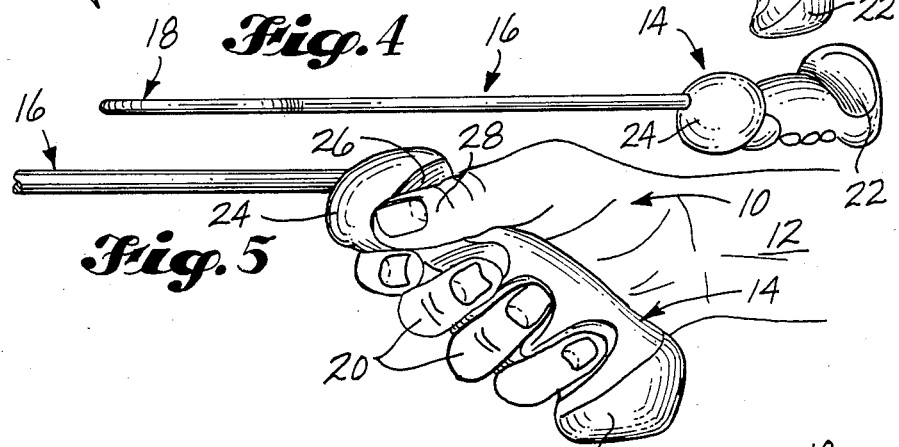
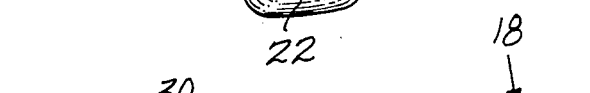
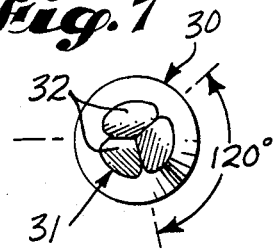
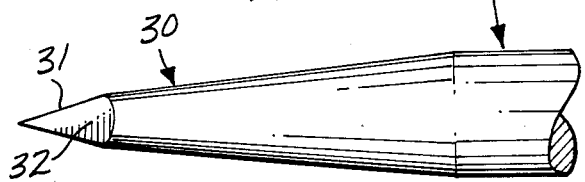

GAFF FOR LANDING FISH

TECHNICAL FIELD

This invention relates to a gaff for landing fish, and particularly one which is less tiring to use and less likely to injure the user's hand or arm in the course of its use.

For centuries fishermen have used a gaff to hook and land fish on the decks of their boats. The task can be an exhausting one, particularly for commercial fishermen, since at the height of the commercial season, even relatively small boats of say 85' in length, can land 100,000 pounds of fish in a period of forty-eight hours or less. Moreover, many of the fish can weigh two hundred pounds or more, and even as much as three hundred and fifty pounds in the case of, for example, halibut caught in the Gulf of Alaska. Each pound of fish is hauled in by means of a gaff, and is manipulated on the decks of the boat in similar fashion. Not surprisingly, a fisherman's arm can suffer great fatigue, and even injury, in gaffing such great weight and numbers of fish in such a short time. It is important, therefore, that the gaff be designed to minimize fatigue, and to eliminate the risk of injury to the fisherman's hand and arm.

The present invention concerns a gaff which has several improvements in it whereby it gives the fisherman a better grip, and better control in landing the fish, and thereby reduces the likelihood of fatigue and the likelihood of injury to his hand and arm, particularly when he is landing such great weight and numbers of fish.

BACKGROUND ART

A gaff typically comprises an elongated shank having a hook on one end thereof and a handle on the other end thereof. The user commonly grips the gaff by the handle but he may instead grip it by the shank, using the handle only as an abutment to take the thrust of his hand when he lands the fish. Some handles are gripped by a handshake-type grip. Others are gripped more palm-down, with the shank interposed between the fingers of the hand. It is this latter type of handle, however, which fishermen commonly abandon, and instead, grip the shank with a handshake-type grip. Since all of the handles are coaxial with the longitudinal axis of the shank, a handshake grip—whether of the handle or the shank—requires that the user bend his hand downwardly from his forearm at the wrist to execute the grip. This risks fatiguing his arm, due to the unnatural way in which he must angle his hand to it when pulling the weight of the fish, and risks injury to his arm in the form of pulled tendons. Alternatively, using a palm-down grip, with the shank between his fingers, the user risks injury to his fingers in the form of torn skin between them due to the rotation or other action of the shank of the gaff within his grip. The palm-down grip also offers the user less control of the gaff, particularly in avoiding hitting the side of the boat when he misses a fish, and that is why many users commonly resort to the shank, and a handshake grip thereof, in holding the gaff.

DISCLOSURE OF THE INVENTION

According to the invention, the gaff comprises an elongated shank of predetermined cross-sectional width, the shank having a hook on one end thereof and a pistol grip handle on the other end thereof. The hook has a first portion thereof which projects from the shank in one lateral direction thereof, and a second relatively outlying portion thereof which extends re-entrantly about the one end of the shank from the first portion of the hook, in the opposing lateral direction of the shank. The handle has a generally cylindrical body which is solid in outline, greater in cross-sectional width than the shank, and obtusely angled to the longitudinal axis of the shank in a plane substantially parallel to that longitudinal axial plane of the shank coinciding with the aforesaid lateral directions of the hook portions. In this way, when the user grips the handle in one hand, the body of the handle fills his hand and the user's forearm assumes a position substantially parallel to the longitudinal axis of the shank while his hand is similarly but oppositely angled to the handle in a typical pistol grip position. In addition, there are elongated indentations in the body of the handle on the inside edge portion thereof which curve about the circumference of the same so as to conform to the curvature of the fingers of the user's one hand when they are passed about the handle in his pistol grip thereon. Meanwhile, the body of the handle extends in the aforesaid opposing lateral direction of the shank, together with the relatively outlying portion of the hook, so that the user can cock and impale the fish with the hook at a point relatively in line with the length of his forearm.

In the presently preferred embodiments of the invention, the body of the handle and the relatively outlying portion of the hook are obtusely angled to the longitudinal axis of the shank along substantially parallel lines.

In addition, in many embodiments, the handle has a relatively enlarged butt at the shank-remote end thereof, to absorb the thrust of the user's one hand when a fish is landed with the gaff. The shank-adjacent end of the handle may also have a relatively enlarged head, to absorb the thrust of the user's hand in the direction of the shank; and the head, in turn, may have a swale in one side thereof, to accomodate the inside of the thumb of the user's one hand in the pistol grip he has on the handle.

Preferably, the tip of the hook is conical and chamfered at the point thereof to have three 120° facets about the circumference thereof.

BRIEF DESCRIPTION OF THE DRAWING

These features will be better understood by reference to the accompanying drawing which illustrates one of the presently preferred embodiments of the invention.

In the drawing:

FIG. 1 is a side elevational view of a typical prior art gaff;

FIG. 2 is an enlarged part side elevational view of the gaff when the gaff is gripped at the shank and put to use in one hand of the user;

FIG. 3 is a side elevational view of the gaff of the present invention;

FIG. 4 is a plan view of the inventive gaff;

FIG. 5 is an enlarged part side elevational view similar to that of FIG. 2, but showing the inventive gaff in use in one hand of the user;

FIG. 6 is an enlarged side elevational view of the tip of the hook of the inventive gaff; and FIG. 7 is an end elevational view of the tip of the hook of the inventive gaff.

BEST MODE FOR CARRYING OUT THE INVENTION

Referring to the drawing, it will be seen that in the prior art, a typical commercial fisherman's gaff 2 comprised an elongated shank 4 having a hook 6 on one end 4' thereof and a handle 8 on the other end 4" thereof. The hook 6 projected from the shank 4 sidewise thereof and in one lateral direction thereof, and then extended reentrantly about the one end 4' of the shank in the opposing lateral direction thereof. The handle 8 was in the form of a T-flange 9 formed from a pair of half loops at the hook-remote end 4" of the shank. The T-flange 9 was rotated about the longitudinal axis of the shank to skew it in relation to the longitudinal axial plane of the shank coinciding with the aforesaid lateral directions of the hook, so that the fisherman could grip the flange in one hand, palm-down, with the shank interposed between his fingers, for purposes of landing a fish. However, he soon found that he tended to experience cut, bruised or lost skin between his fingers, and he found that this method of gripping the gaff did not provide him good control of it, particulalrly when he missed a swing at a fish. That is, he was not able to stop the gaff from hitting the side of the boat when he had missed the fish in his swing. As a consequence, many fisherman resorted to gripping the gaff at the shank 4 in the manner of FIG. 2, perhaps after first wrapping the shank in rubber (not shown). This method provided better control, particularly in handling a spinning fish, but as seen in FIG. 2, the hand-shake grip he employed, required that he arch his wrist over the flange and bend his hand 10 downwardly from his forearm 12 at the wrist, to grasp the gaff at the shank. This contortion was uncomfortable to him and often resulted in pulled tendons in his arm. It also quickly exhausted his arm, because of the strain his muscles and tendons underwent in contorting his arm this way.

Referring now to FIGS. 3–7, it will be seen that the inventive gaff 13 has a pistol-grip-sized handle 14 which extends substantially parallel to that longitudinal axial plane of the shank 16 coinciding with the aforesaid lateral directions of the hook 18, but is obtusely angled to the longitudinal axis of the shank so that when the user grips the handle in one hand his forearm is substantially parallel to the longitudinal axis of the shank and his hand is similarly but oppositely angled to his forearm in a typical pistol grip position. The handle 14 also has indentations 19 along the relatively inside edge thereof, which are adapted to receive the palm sides of the fingers 20 of his hand when the handle is gripped in the same. In addition, the handle has a greatly enlarged butt 22 at the shank-remote end thereof, to absorb the thrust of his hand when a fish is landed with the gaff; and also a greatly enlarged head 24 at the shank-adjacent end thereof, to absorb the thrust of his hand in the direction of the shank. The head 24, in turn, has a swale 26 in one side thereof, to accomodate the inside of his thumb 28 when his hand takes the pistol grip position on the handle.

Preferably, the hook 18 is longer and angled more flatly to the shank 16 than that of the prior art, as seen in FIG. 3, and the tip 30 of the hook is conical and chamfered at the point 31 thereof to have three 120° facets 32 about the circumference thereof for easier penetration of the fish and easier care of the gaff.

An angle of about 42° from the axis of the shank 16 is preferred for the handle 14. This provides the best grip, and the best comfort, control and accuracy in the use of the gaff.

The hook 18 is best angled to the shaft at half that angle, and is angled at about 35° to the shank at the tip 30 thereof. These angles provide the best resistance to bending in use.

The improvements place the user's arm 12 in line with the length of the gaff 13 and enable his hand 10 to take a relaxed pistol grip on the handle 14 of it. The pistol grip gives him a better grasp of the gaff, and better control of it in landing the fish and manipulating it onboard his boat. It also gives him more driving power in cocking and impaling the hook 18 in the snout of the fish. Thereafter, most of the thrust from the weight of the fish is absorbed in the body of the handle, and in the butt 22 at the shank-remote end thereof in particular. There is little likelihood that the handle 14 can rotate in the user's hand, and little to abrade or tear his fingers as he manipulates the gaff in landing the fish.

I claim:

1. A gaff for landing fish comprising
   an elongated shank of predetermined cross-sectional width,
   said shank having a hook on one end thereof and a pistol grip handle on the other end thereof,
   said hook having a first portion thereof which projects from the shank in one lateral direction thereof, and a second relatively outlying portion thereof which extends re-entrantly about the one end of the shank from the first portion of the hook, in the opposing lateral direction of the shank,
   said handle having a generally cylindrical body which is solid in outline, greater in cross-sectional width than the shank, and obtusely angled to the longitudinal axis of the shank in a plane substantially parallel to that longitudinal axial plane of the shank coinciding with the aforesaid lateral directions of the hook portions, so that when the user grips the handle in one hand, the body of the handle fills his hand and the user's forearm assumes a position substantially parallel to the longitudinal axis of the shank while his hand is similarly but oppositely angled to said handle in a typical pistol grip position,
   there being elongated indentations in the body of the handle on the inside edge portion thereof which curve about the circumference of the same so as to conform to the curvature of the fingers of the user's one hand when they are passed about the handle in his pistol grip thereon, and
   the body of the handle extending in the aforesaid opposing lateral direction of the shank, together with the relatively outlying portion of the hook, so that the user can cock and impale the fish without the hook at a point relatively in line with the length of his forearm.

2. The gaff according to claim 1 wherein the handle has a relatively enlarged butt at the shank-remote end thereof, to absorb the thrust of the user's one hand when a fish is landed with the gaff.

3. The gaff according to claim 2 wherein the handle also has a relatively enlarged head at the shank-adjacent end thereof, to absorb the thrust of the user's hand in the direction of the shank.

4. The gaff according to claim 3 wherein the head has a swale in one side thereof to accomodate the inside of the thumb of the user's one hand in the pistol grip he has on the handle.

5. The gaff according to claim 1 wherein the tip of the hook is conical and chamfered at the point thereof to have three 120° facets about the circumference thereof.

6. The gaff according to claim 1 wherein the body of the handle and the relatively outlying portion of the hook are obtusely angled to the longitudinal axis of the shank along substantially parallel lines.

* * * * *

UNITED STATES PATENT AND TRADEMARK OFFICE
CERTIFICATE OF CORRECTION

PATENT NO. : 4,691,465
DATED : September 8, 1987
INVENTOR(S) : Patrick D. Dooley It is certified that error appears in the above-identified patent and that said Letters Patent are hereby corrected as shown below:

Claim 1, line 54 of Column 4, delete "without" and substitute --with--.

Signed and Sealed this

Twenty-third Day of February, 1988

Attest:

DONALD J. QUIGG

Attesting Officer

Commissioner of Patents and Trademarks